US008007424B2

(12) United States Patent
Moser et al.

(10) Patent No.: US 8,007,424 B2
(45) Date of Patent: Aug. 30, 2011

(54) MOTOR-DRIVEN MACHINE TOOL

(75) Inventors: Andreas Moser, Ostfildern (DE); Joerg Dehde, Steinenbronn (DE); Steffen Tiede, Herrenberg (DE)

(73) Assignee: Robert Bosch GmbH, Stuttgart (DE)

( * ) Notice: Subject to any disclaimer, the term of this patent is extended or adjusted under 35 U.S.C. 154(b) by 326 days.

(21) Appl. No.: 12/377,625

(22) PCT Filed: Oct. 18, 2007

(86) PCT No.: PCT/EP2007/061124

§ 371 (c)(1), (2), (4) Date: Feb. 16, 2009

(87) PCT Pub. No.: WO2008/074536

PCT Pub. Date: Jun. 26, 2008

(65) Prior Publication Data

US 2010/0279839 A1 Nov. 4, 2010

(30) Foreign Application Priority Data

Dec. 18, 2006 (DE) ......................... 10 2006 059 688

(51) Int. Cl.
*B23Q 3/157* (2006.01)
*B23B 45/02* (2006.01)

(52) U.S. Cl. ................. 483/57; 483/61; 483/39; 408/35

(58) Field of Classification Search .............. 483/60–61, 483/57, 54, 47, 43, 42, 39; 408/35; 81/439, 81/490, 177.4

See application file for complete search history.

(56) References Cited

U.S. PATENT DOCUMENTS

| | | | | |
|---|---|---|---|---|
| 2,679,770 | A * | 6/1954 | Carter et al. | 408/35 |
| 4,557,035 | A * | 12/1985 | Rutschle et al. | 483/47 |
| 4,604,005 | A * | 8/1986 | Russ | 408/35 |
| 4,827,600 | A * | 5/1989 | Miyano | 483/54 |
| 4,928,381 | A * | 5/1990 | Yaguchi et al. | 483/47 |
| 4,995,161 | A * | 2/1991 | Okamura et al. | 483/51 |
| 5,065,498 | A | 11/1991 | McKenzie | |
| 5,346,453 | A | 9/1994 | Rivera-Bottzeck | |
| 5,597,275 | A * | 1/1997 | Hogan | 408/35 |
| 5,893,685 | A * | 4/1999 | Olson et al. | 483/51 |
| 7,500,981 | B1 * | 3/2009 | Jubrail | 606/162 |
| 2005/0049126 | A1 * | 3/2005 | Everson et al. | 483/47 |

FOREIGN PATENT DOCUMENTS

| | | | |
|---|---|---|---|
| DE | 4332294 | A1 * | 2/1994 |
| DE | 197 37 892 | | 5/1998 |
| DE | 199 51 264 | | 4/2001 |
| DE | 100 45 617 | | 4/2002 |
| DE | 101 48 319 | | 4/2003 |
| GB | 1073681 | A * | 6/1967 |

* cited by examiner

*Primary Examiner* — Erica E Cadugan
(74) *Attorney, Agent, or Firm* — Michael J. Striker

(57) ABSTRACT

A motor-driven machine tool (1) for tools which are to be driven rotationally has, configured as a hand-held machine tool, a pistol-shaped basic shape, in which, lying one behind the other in the stock part (2) in the direction of the main axis, a motor (4), a gear mechanism (5) and a tool changing magazine (6) are provided as a structural unit, wherein the tool changing magazine (6) which is designed, in particular, as a drum magazine is mounted on a neck (24) of the gear mechanism housing (22) and is penetrated by the output shaft (23) of the gear mechanism (5).

20 Claims, 3 Drawing Sheets

MOTOR-DRIVEN MACHINE TOOL

CROSS-REFERENCE TO RELATED APPLICATION

The invention described and claimed hereinbelow is also described in German Patent Application DE 10 2006 059 688.9 filed on Dec. 18, 2006. This German Patent Application provides the basis for a claim of priority of invention under 35 U.S.C. 119(a)-(d).

BACKGROUND OF THE INVENTION

The present invention relates to a motor-driven machine tool, in particular a hand-held power tool having a rotatably driveable tool.

A machine tool of this type is known as a battery-operated, hand-held power tool from DE 199 51 264 A1 in the embodiment shown in FIG. 12 therein. When the machine housing is pistol-shaped, the known hand-held power tool has a main axis which extends in the direction of the pistol barrel. In the rear region of the shank part which is connected to the handle, the machine housing accommodates the motor and the transmission, as a coaxial drive unit, the transmission being connected to a tool fitting in a driving manner, and being supported, axially offset relative to the motor and the transmission, in the region of the front wall of the machine housing on the front side, the rotational axis extending parallel to the main axis. A tool-changing magazine designed as a hollow cylindrical drum magazine is supported upstream of the tool fitting. The axes of the drum magazine and the tool fitting extend parallel to the main axis. In its drum ring, the drum magazine includes tool chambers which extend parallel to the main axis, each of which assumes an aligned, overlapping position relative to the tool fitting depending on the rotational position of the drum magazine. In this overlapping position, it is possible to displace the particular tool between the tool chamber and the tool fitting. The displacement is carried out via an actuating element which is coaxial to the tool fitting, is guided in the housing, and is designed as an actuating slide which is situated in the axial transition region between the transmission and the drum magazine. The drum magazine is also supported in the housing, and it is penetrated by the transmission output shaft in its central region which is enclosed by drum ring which contains the tool chambers, the transmission output shaft being connected in a driving manner to the tool fitting via an intermediate transmission which bridges the axial distance between the transmission output shaft and the tool fitting. Given that the components must be placed in the correct positions relative to one another, a design of this type requires a relatively great deal of production outlay, makes assembly difficult, and requires a great deal of space.

SUMMARY OF THE INVENTION

The object of the present invention is to design a machine tool, in particular a hand-held power tool of the type described initially, having a compact design, in a manner that is easy to produce and assemble.

In the solution according to the present invention, which is also advantageous for use, in particular, with hand-guided machines tools which are designed as screwdrivers, the displaceable support of the tool-changing magazine on the drive unit results in a compact and easily assembled design which makes it possible to create a narrow, easy-to-handle machine housing, even in the shank region of pistol-shaped machine housings of hand-held power tools. This is combined with a relative large diameter of the tool-changing magazine, thereby making it possible to provide a large number of tool chambers.

In the solution according to the present invention, the tool-changing magazine is preferably displaceably supported via the transmission, on the drive unit which includes the transmission and the motor.

When the tool-changing magazine is designed as a drum magazine, it has proven particularly advantageous to provide rotatable support of the drum magazine relative to the drive unit, in particular its transmission. For this purpose, the transmission may be provided with a transmission neck which is enclosed by the drum ring of the drum magazine, in which the tool chambers are located, the transmission output shaft extending through the drum magazine. Given a spacially compact design of the transmission, it is therefore possible to support the transmission output shaft in the transition region to the transmission neck, or inside the transmission neck.

In combination with an embodiment of the transmission as a planetary gearset in particular, it is possible to realize a design which is also very short, in the case of which the support of the transmission output shaft and the drum magazine may be realized in regions which are axially adjacent to one another or even overlap one another.

It is therefore possible to attain a stable support of the transmission output shaft using an embodiment that is not so large that machine handling is affected.

In order to favorably support the intermediate transmission which connects the transmission output shaft to the tool fitting, the transmission output shaft may be supported in the region of its free end opposite the transmission in a bearing plate which also provides support for the tool fitting. The tool fitting is preferably structurally integrated in one of the wheels of the intermediate transmission, the other wheel of which is mounted, as a driving wheel, on the transmission output shaft, the intermediate transmission being situated, in all, and in a space-saving manner, between this bearing plate and the tool-changing drum, and by the transmission neck which is enclosed by the tool-changing drum.

This design makes it possible to design the actuating element—which is provided to move a particular tool between a tool chamber of the drum magazine and the tool fitting—as an actuating slide, in the form of an actuating rod which preferably extends—parallel to the main axis of the machine which coincides with the axis of the drive unit—through the transmission housing, on the circumferential side of the transmission housing, thereby also supporting the forces which act on the actuating slide on the drive unit, and in particular on the transmission housing. This is significant, in particular, given that the particular tool is supported axially via the actuating slide in its operating position in the tool fitting; the bearing plate is therefore also supported indirectly via the actuating slide when it engages axially in the tool fitting, since the tool fitting is rotatably supported against the bearing plate.

The design of the actuating slide as an actuating rod makes it possible, using simple means, to support it axially in its position which provides axial support for a tool contained in the tool fitting, thereby making it possible, e.g. via a support plate which extends in the longitudinal direction of the actuating slide on the back side thereof, and which is spring-loaded in its support position which reaches behind the actuating slide, and which may be displaced in the opposite direction using a button for release. The button which is displaceable only transversely to the main axis, and the handle required to axially displace the actuating slide are preferably located in appropriate recesses in the housing of the machine, extend through them, and are situated adjacent to one another relative to the support position of the actuating slide.

The support plate is preferably clamped in a holder which is fixed in portion relative to the housing, and possibly also relative to the motor transmission unit, in a manner such that it is preloaded via spring action in its support position in which it reaches behind the actuating slide. Via the support plate, it is therefore possible to also act on the actuating slide in a frictional manner and to secure it in its position in which it is retracted from the tool fitting when the support plate bears against the circumference of the slide.

In the solution according to the present invention, it is possible, in particular, to create an assembly which extends from the motor to the tool fitting and includes the drive unit, the assembly being merely enclosed by the machine housing which is essentially used only as a cover. The machine housing may therefore be made simpler and lighter-weight in design. In the embodiment as a hand-held power tool in particular, the machine housing is designed in the shape of a pistol and includes a grip part in which an energy accumulator, in particular a rechargeable battery, and the associated control are preferably housed, the control preferably being located in the transition region between the handle and the shank of the pistol-shaped machine housing, the actuating device—which is preferably designed as a button-switch combination—also being preferably situated in this transition region in particular.

The handling of the machine according to the present invention is also simplified and made lighter-weight by the fact that the drum-type changing magazine overlaps a cut-out section of the housing in a subregion of its circumference, in particular extending beyond the circumference of the housing via one segment in the region of this cut-out section. The tool-changing magazine may therefore be displaced via direct access. An arrangement of this type, in particular in combination with a design of the machine housing which is based on the assembly which includes the drive unit and is reinforced by it, also makes it possible, as an option, to swivel the tool-changing magazine outwardly—as is known with drum revolvers—in order to load tools.

To identify the particular tools which are stored in the tool chambers of the drum-type tool-changing magazine, it is also expedient for the tool-changing magazine to be provided with markings, e.g. symbols, that identify the particular tool, on its circumferential side and overlapping the particular chamber; when the tool-changing magazine is displaced, these symbols become aligned with a viewing window in the housing. This viewing window is preferably provided with a transparent cover which is designed as a magnifying glass in particular, and is situated in the housing in longitudinal alignment with the tool fitting, thereby resulting in a placement that is simple in terms of the operating position.

A displaceable arrangement of the tool-changing magazine may also be attained within the scope of the present invention when it is supported against the drive unit using rod magazines; this magazine may be moved—possibly being displaced transversely to the main axis in and/or through the machine housing—with its tool chambers until it overlaps the tool fitting.

Further advantages and expedient embodiments are depicted in the claims, the description of the figures, and the drawing.

DESCRIPTION OF THE PREFERRED EMBODIMENTS

Figure 1:
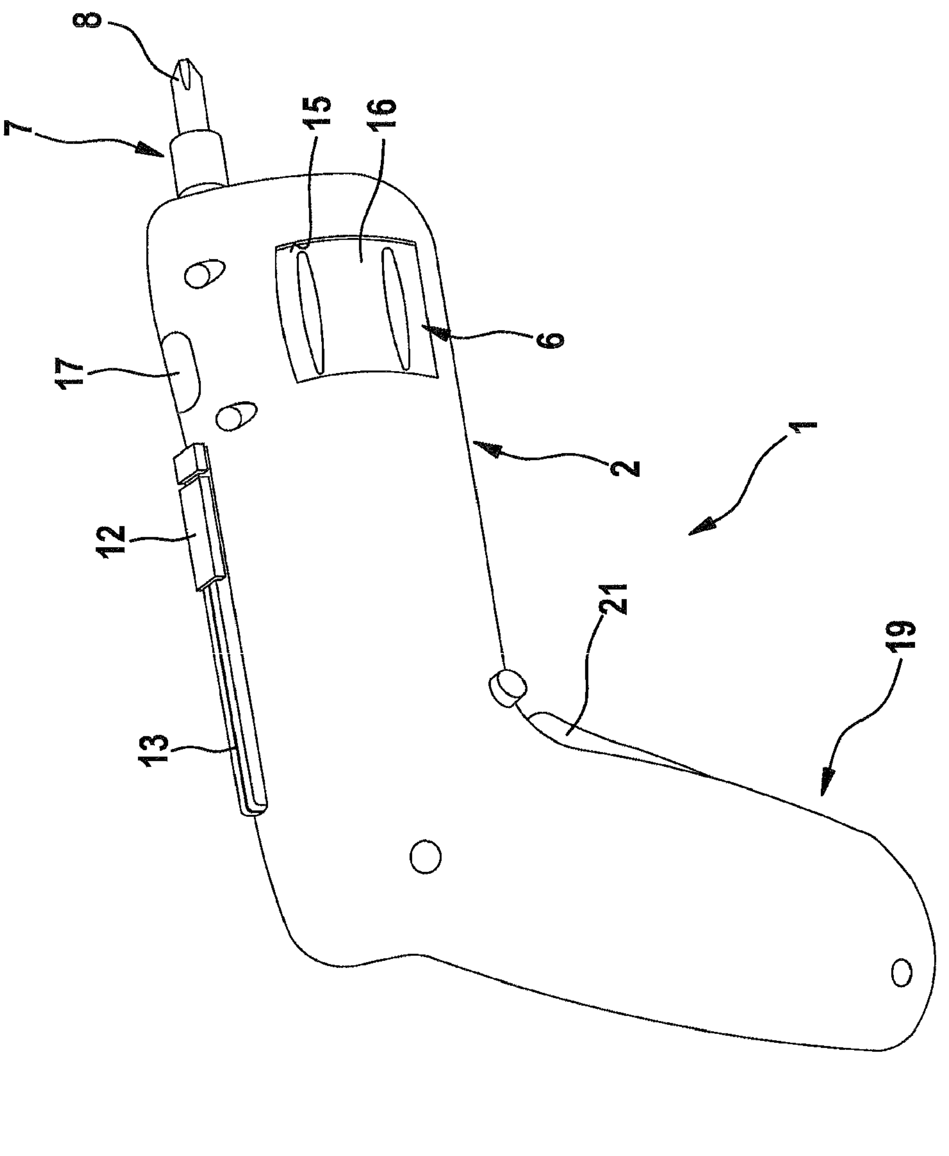
FIG. 1 shows a perspective view of the hand-held power tool according to the present invention, in the form of a cordless screwdriver, the energy source of which is a rechargeable battery.

The embodiment of a motor-driven machine tool 1 shown in the figures is a hand-held power tool which is designed as a screwdriver, and which—when machine housing 14 is pistol-shaped in design—includes a shank part 2 which corresponds to the pistol barrel. Main axis 3 extends in the longitudinal direction of shank part 2. Motor 4 and transmission 5—as part of a drive unit—are situated along main axis 3, being situated coaxially one behind the other and determining the main axis. A drum magazine, as tool-changing magazine 6, is situated on transmission 5. A tool fitting 7 is offset relative to main axis 3; in the figures, tool fitting 7 has an inserted tool which is a screwdriver insert 8 in this case and extends parallel to main axis 3. An intermediate transmission 9 is situated in the drive for tool fitting 7, the drive being carried out via motor 4 and transmission 5. An actuating element 10 which is designed as an actuating slide 11 and is actuated using handle 12 is also provided in order to load tool fitting 7 with the desired tool which is stored in tool-changing magazine 6, and to provide axial support for this tool in its operating position in tool fitting 7. Handle 12 is displaceable in a longitudinal slot 13 which extends in the direction of main axis 3, longitudinal slot 13 lying in the dividing plane of machine housing 14 which is composed of two housing halves; the axis of tool fitting 7 also lies in this dividing plane.

Machine housing 14 includes, in the region of tool-changing magazine 6 which is designed as a drum magazine, a cut-out section 15, in the region of which tool-changing magazine 6 is exposed via one segment 16, the tool-changing magazine 6 preferably extending past the outer contour of machine housing 14 via segment 16.

A viewing window 17 which may preferably be provided with a magnifier-type insert is also provided in the region of overlap with tool-changing magazine 6, thereby making it possible to easily identify symbols which characterize the tool and are provided on the circumference of drum-shaped tool-changing magazine 6. Viewing window 17 preferably overlaps the dividing plane of the housing halves of machine housing 14 and is aligned with slot 13 for handle 12 of actuating slide 11. A button 18 is situated between slot 13 and viewing window 17, upstream of handle 12.

Figure 2:
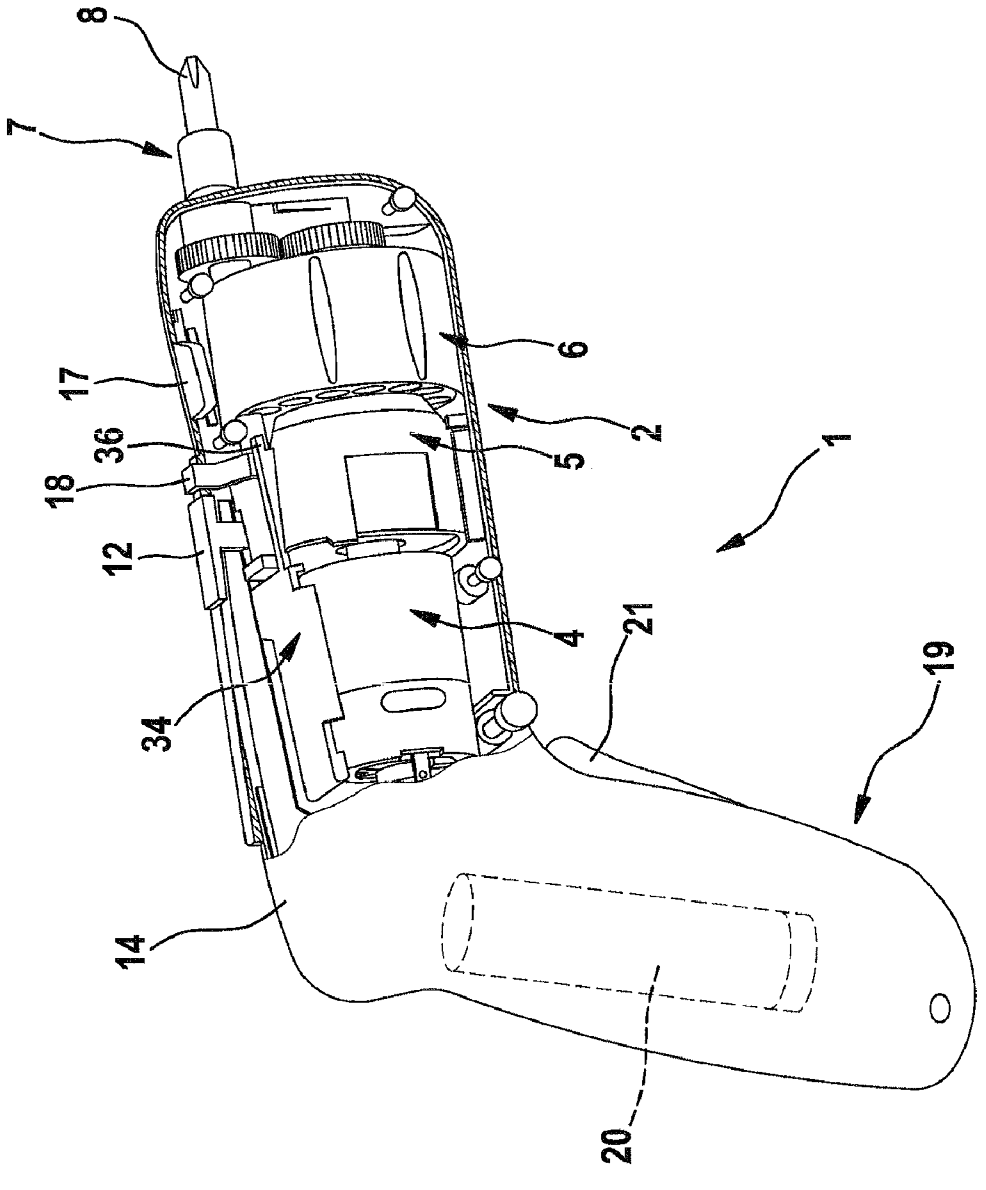
FIG. 2 shows an illustration which is similar to FIG. 1, but with the housing half removed which includes the viewing window.
Figure 3:
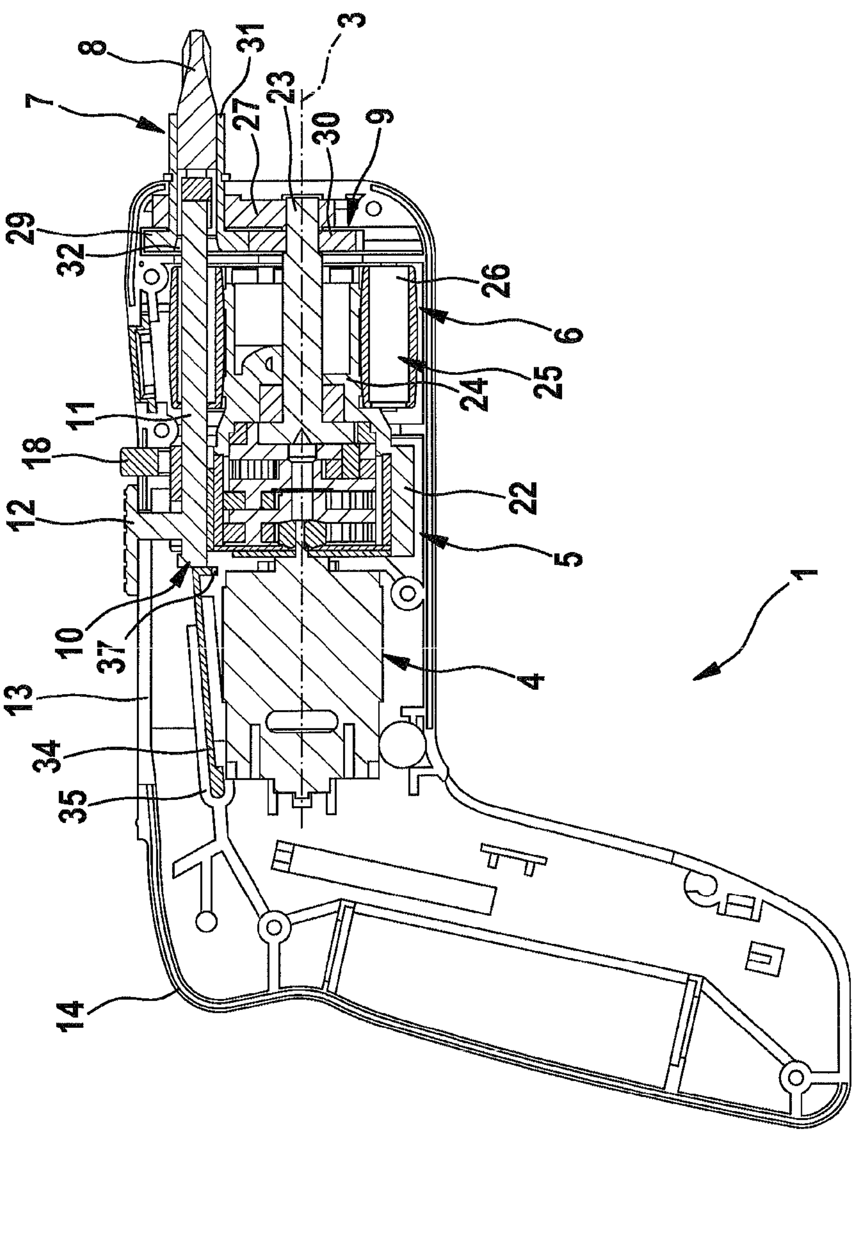
FIG. 3 shows a schematicized cross-sectional view of the hand-held power tool shown in FIGS. 1 and 2, in a longitudinal sectional view, with the tool fitting situated in the cutting plane.

FIGS. 2 and 3 also show that a rechargeable battery, as energy accumulator 20, is situated in grip part 19 which extends transversely to shank part 2, and via which motor 4 is supplied; the control is also located in grip part 19, and operating element 21 which is designed as a button and/or a switch and is used by an operator for control purposes is situated in the dividing plane between the housing halves.

The cross-sectional view presented in FIG. 3 shows that transmission 5 is designed as a planetary gearset, is aligned with motor 4, and is combined with motor 4 to form a drive unit. Transmission 5 includes a transmission housing 22 which includes a neck 24 which extends in the direction of the main axis and encloses output shaft 23 of transmission 5.

Tool-changing magazine 6 which is designed as a drum magazine is situated in the region of neck 24; tool-changing magazine 6 includes a drum ring 25 which is concentric to the drum axis, and in which tool chambers 26 are provided which extend parallel to the drum axis and main axis 3, are preferably distributed evenly around the circumference, and to which tool symbols are assigned, the tool symbols being situated on the circumference of drum ring 25 and overlapping viewing window 17.

FIG. 3 also shows that output shaft 23 of transmission 5 terminates in the region of a bearing plate 27 which is located on the front-side end of the machine; output shaft 23 is supported relative to bearing plate 27. Intermediate transmission 9 is situated in the axial region between bearing plate 27 and tool-changing magazine 6 which is supported on neck 24; intermediate transmission 9 bridges the radial distance between output shaft 23 and tool fitting 7 transversely to main axis 3. Tool fitting 7 is assigned to output-side gear 29 of intermediate transmission 9, drive-side gear 30 of which is mounted on output shaft 23 of transmission 5. Output-side gear 29 includes a neck 31 which extends in the direction of the axis of gear 29 and encloses a central passage 32 through gear 29. Neck 31 is designed as tool fitting 7 and has a non-circular profile in order to non-rotatably support the tool that has been inserted, i.e. a screwdriver insert 8 in this case. When tool-changing magazine 6 is rotated, a particular tool chamber 26 is moved into coaxial overlap with tool fitting 7, the particular overlap positions being defined as traversable, detent positions.

In an overlap position, as shown in FIG. 3, it is possible to displace a tool—a screwdriver insert 8 in this case—out of a tool chamber 26 of tool-changing drum 6 and into tool fitting 7, and out of tool fitting 7 and into a tool chamber 26 of tool-changing drum 6. This is carried out using actuating member 10 in the form of an actuating slide 11 which is connected to handle 12 and is designed as an actuating rod. The head side of actuating slide 11 is designed such that the particular tool may be slid into or pulled out of tool fitting 7. For this purpose, actuating slide 11 is preferably magnetic in its head region. After a tool, e.g. a screwdriver insert 8 in this case, has been slid into tool fitting 7, tool-changing magazine 6 is blocked via actuating slide 11 in its position in which it is aligned, via a particular tool chamber 26, with tool fitting 7; via the engagement of actuating slide 11 in tool fitting 7, tool fitting 7 is also supported—given that it is supported in bearing plate 27—against transmission housing 22 in which actuating slide 11 extends in a longitudinally displaceable manner. Actuating slide 11 is therefore part of the assembly which extends from motor 4 to tool fitting 7, and which, being embedded in machine housing 14, is enclosed by machine housing 14 essentially only in a covering manner, therefore also serving to reinforce machining housing 14.

In its position in which it bears against a particular tool, a screwdriver insert 8 in this case, in tool fitting 7, actuating slide 11 is locked via a support lever 34 which, in the embodiment, is designed as a support plate which is held on its end opposite actuating slide 11 in a slot-shaped guide 35 which extends adjacent to motor 4. The support plate which acts as support lever 34 extends, as shown in FIG. 2, via one arm 36 into the region of button 18, and may be displaced, via button 18, out of the support position shown in FIG. 3 in particular against its spring-action preload in the direction toward button 18 or its support position. In the support position, support lever 34 which is designed as a support plate reaches behind actuating slide 11 via an angled end part 37; as such, end part 37 forms a contact surface with the rear end face of actuating slide 11.

When support lever 34 which is designed as an actuating rod has been displaced out of the support position via the actuation of button 18, it may be passed over by actuating slide 11, preferably bearing against actuating slide 11 on the circumference, thereby securing actuating slide 11—in its retracted position in which it releases tool-changing magazine 6—via a frictional connection, and possibly via a frictional connection and in a traversable, locking manner.

In the solution presented according to the present invention, as shown in FIG. 3 in particular, the position of transmission neck 24 is eccentric to output shaft 23 of transmission 5, which extends through it, the axis of output shaft 23 being situated coaxially to the axis of motor 4 and transmission 5. In accordance with the axial offset of transmission neck 24 relative to output shaft 23, tool-changing magazine 6 which is supported on transmission neck 24 is also axially offset. The embodiment shown illustrates that, due to this design and given stable support, different eccentricities of tool-changing magazine 6 relative to output shaft 23 may be realized, and a centric arrangement is also possible, thereby ensuring that a great deal of play exists with regard for the structural dimensions and the number of tool chambers 26 in tool-changing magazine 6. In particular, the figures also show how, despite the arrangement of a tool-changing magazine 6 and the resultant convenience afforded the operator, the hand-held power tool having a pistol shape may be made narrow in design, in particular in its shank part 2 which abuts grip part 19, thereby making it easier to guide machine tool 1 using both hands.

A machine tool 1 which has a design of this type and may be manually-guided may also be used as a drill, in the case of which tool chambers 26 are used to accommodate drill bits which may be used in alternation.

What is claimed is:

1. A motor-driven hand-held machine tool (1), comprising
a rotatably driveable tool bit (8) rotatable about a tool bit axis,
a drive unit for rotating the tool bit (8) and including a motor (4), a transmission (5), a transmission housing (22), and a transmission output shaft (23) rotatable about an output shaft axis by the motor (4), wherein the motor (4), the transmission (5), the transmission housing (22), and the transmission output shaft (23) are aligned along the output shaft axis, and
a tool-changing magazine (6), tool chambers (26) of which are displaceable into a position of handing off a tool bit held by a respective tool chamber to a tool fitting (7) to be loaded, wherein the tool-changing magazine (6) is rotatably supported on the transmission housing (22) of the drive unit in a displaceable manner, and wherein the motor (4) is completely spaced in the axial direction of the output shaft axis from the tool-changing magazine (6).

2. The machine tool as recited in claim 1, wherein the tool-changing magazine (6) is designed as a drum-shaped magazine.

3. The machine tool as recited in claim 2, wherein the drum-shaped tool-changing magazine (6) is supported such that it encloses a part of the transmission (5), on the housing (22) of the transmission (5).

4. The machine tool as recited in claim 3, wherein the housing (22) of the transmission (5) includes a neck (24) which encloses the transmission output shaft (23), the tool-changing magazine (6) being supported on the neck (24).

5. The machine tool as recited in claim 4, wherein the transmission output shaft (23) extends, at an end thereof, through a bearing plate (27) which is fixed in position relative to a machine housing (14), and which forms a support for the tool fitting (7).

6. The machine tool as recited in claim 1, wherein the tool-changing magazine (6) is supported such that it encloses a portion of the transmission housing of the drive unit.

7. The machine tool as recited in claim 1, wherein the tool fitting (7) is driven via an intermediate transmission (9) which connects the tool fitting—which extends in a direction parallel to the output shaft axis (3) of the drive unit—and the transmission output shaft (23), which extends through a space enclosed by a drum ring of the tool-changing magazine (6).

8. The machine tool as recited in claim 7, wherein the intermediate transmission (9) is situated between the tool-changing magazine (6) and a bearing plate (27), and wherein the tool fitting (7) is concentrically assigned to a wheel (29) of the intermediate transmission (9).

9. The machine tool as recited in claim 8, wherein the wheel (29)—which is concentric to the tool fitting (7)—of the intermediate transmission (9) includes a neck (31) which is provided as the tool fitting (7); the neck (31) is an extension of a passage (32) through the wheel (29), through which an actuating element (10) extends.

10. The machine tool as recited in claim 7, wherein said intermediate transmission (9) comprises an output-side gear (29) and a drive-side gear (30), wherein said tool fitting (7) is assigned to said output-side gear, and said drive-side gear is mounted on said output shaft (23).

11. The machine tool as recited in claim 10, wherein said output-side gear includes a neck which extends in the direction of the axis of said output-side gear and encloses a central passage through said output-side gear, said neck being configured as said tool fitting.

12. The machine tool as recited in claim 1, wherein the machine tool is provided with a viewing window (17).

13. The machine tool as recited in claim 12, wherein the viewing window (17) is provided in a region of overlap with the tool-changing magazine.

14. The machine tool as recited in claim 12, wherein the viewing window has a magnifier insert.

15. The machine tool as recited in claim 1, wherein an actuating element (10) is provided which is displaceable in an axial direction of the tool fitting (7) to a location such that the actuating element is against a tool bit of an overlapping tool chamber (26) of the tool-changing magazine (6).

16. The machine tool as recited in claim 15, wherein the actuating element (10), which is designed as an actuating slide (11), is guided on the drive unit in a manner such that its position relative to a machine housing (14) is displaceable to an operating position such that the actuating slide extends through a particular tool chamber (26), bears against a tool bit, which has been moved out of the tool chamber (26) and into the tool fitting (7).

17. The machine tool as recited in claim 16, wherein the actuating slide (11) is lockable—using a support lever (34) and in a releasable manner—in its position of bearing against the tool bit which is situated in the tool fitting (7).

18. The machine tool as recited in claim 17, wherein the support lever (34) is moveable into its locking position via an actuation of a button.

19. The machine tool as recited in claim 1, wherein the machine tool (1) is designed as a hand-guided screwdriver having a pistol shape, and includes an energy accumulator (20) which is located in a grip part (19).

20. The machine tool as recited in claim 1, wherein a housing of the machine tool has a cut-out section that exposes a segment of the tool-changing magazine (6).

* * * * *